(12) United States Patent
Leitko, Jr. et al.

(10) Patent No.: US 9,915,097 B2
(45) Date of Patent: Mar. 13, 2018

(54) BEARING SECTION OF A DOWNHOLE DRILLING MOTOR

(71) Applicant: Axon EP, Inc., Houston, TX (US)

(72) Inventors: Curtis E. Leitko, Jr., Round Top, TX (US); Rory J. Mallard, Jr., Houston, TX (US); Gerard T. Pittard, Houston, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 0 days.

(21) Appl. No.: 14/631,421

(22) Filed: Feb. 25, 2015

(65) Prior Publication Data

US 2016/0245021 A1   Aug. 25, 2016

(51) Int. Cl.
| | | |
|---|---|---|
| F16C 3/00 | (2006.01) | |
| E21B 4/00 | (2006.01) | |
| F16D 1/10 | (2006.01) | |
| F16C 41/02 | (2006.01) | |
| F16C 19/10 | (2006.01) | |
| F16C 19/30 | (2006.01) | |
| F16C 19/54 | (2006.01) | |
| F16C 19/26 | (2006.01) | |

(52) U.S. Cl.
CPC .............. *E21B 4/003* (2013.01); *F16C 19/10* (2013.01); *F16C 19/30* (2013.01); *F16C 19/545* (2013.01); *F16C 41/02* (2013.01); *F16D 1/10* (2013.01); *F16C 19/26* (2013.01); *F16C 2352/00* (2013.01)

(58) Field of Classification Search
CPC .......... F16C 17/04; F16C 17/26; F16C 19/10; F16C 19/30; F16C 19/54; F16C 21/00; F16C 27/08; F16C 35/08; F16C 35/10; F16C 35/12; F16C 2352/00; E21B 4/003
See application file for complete search history.

(56) References Cited

U.S. PATENT DOCUMENTS

| | | | | |
|---|---|---|---|---|
| 2,499,651 | A * | 3/1950 | Kendrick ................. | F16C 19/10 384/617 |
| 3,652,140 | A * | 3/1972 | Bruno ..................... | F16C 19/54 384/613 |
| 5,074,681 | A * | 12/1991 | Turner .................... | E21B 4/003 175/107 |
| 5,480,233 | A * | 1/1996 | Cunningham .......... | E21B 4/003 384/304 |

(Continued)

*Primary Examiner* — James Pilkington (57) ABSTRACT

A bearing assembly for a downhole motor is provided. The bearing assembly includes a housing and a drive shaft designed to rotate with respect to the housing. The bearing assembly also includes stackable thrust bearings, each preloaded via a corresponding spring component. Some thrust bearings are arranged such that their spring components distribute axial loads from the housing in a first direction to the thrust bearings. Other thrust bearings are arranged such that their spring components distribute axial loads from the drive shaft in the first direction to the thrust bearings. Thus, the bearing assembly may be tailored via the stackable bearings to distribute axial thrust forces on the downhole motor evenly across the different thrust bearings. The bearing section may include a machinable spacer used to provide a double shouldered connection between the drive shaft and a drive shaft cap used to compress the stackable bearings.

18 Claims, 7 Drawing Sheets

(56) References Cited

U.S. PATENT DOCUMENTS

| | | | | |
|---|---|---|---|---|
| 5,690,434 | A * | 11/1997 | Beshoory | E21B 4/003 175/107 |
| 6,250,806 | B1 * | 6/2001 | Beshoory | E21B 4/003 175/107 |
| 6,361,217 | B1 * | 3/2002 | Beasley | E21B 4/003 384/121 |
| 7,708,468 | B2 * | 5/2010 | Dambaugh | F16C 19/30 384/619 |

* cited by examiner

BEARING SECTION OF A DOWNHOLE DRILLING MOTOR

TECHNICAL FIELD

Embodiments of the present disclosure relate generally to downhole drilling motors, and more specifically, to improved bearing sections for supporting rotating components of the downhole drilling motors.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

In conventional drilling operations, a string of drill pipe or other drilling tubular is lowered into a wellbore. The lower end of the drill string typically includes a bottom hole assembly (BHA), which features a drill bit that can be rotated to cut into the subterranean formation to advance the wellbore through the formation. Some existing systems utilize a downhole drilling motor that is part of the BHA to rotate the drill bit.

Downhole drilling motors include a drive shaft that may be coupled to the drill bit to rotate the drill bit at a desired rate. The drive shaft is located inside a housing and designed to rotate with respect to the housing. Existing downhole drilling motors typically include a bearing assembly designed to support the rotating drive shaft within the housing while allowing rotation of the shaft. These bearing assemblies often include a series of radial bearings, thrust bearings, or other types of bearings designed to accommodate the forces expected on the rotating components of the downhole motor. In general, thrust bearing assemblies may include several thrust bearings designed to dissipate axial forces on the drive shaft as the shaft is rotated. Such forces may come from the weight placed on the drill bit from a surface of the drilling system, as well as from fluid being pumped through the drive shaft toward the drill bit.

Unfortunately, existing thrust bearing assemblies for downhole motors are relatively complex systems that are not easily adaptable for use in a variety of drilling operations. Additionally, drive shafts in existing downhole motors often are constructed with steps or shoulders around a diameter of the shaft for engaging with the bearing assembly. Such steps can lead to undesirable force concentrations in the shaft, thus lowering the lifetime of the drive shaft.

BRIEF DESCRIPTION OF THE DRAWINGS

For a more complete understanding of the present disclosure and its features and advantages, reference is now made to the following description, taken in conjunction with the accompanying drawings, in which.

Certain embodiments are described in the following detailed description and in reference to the drawings in which.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to an improved bearing assembly for use in downhole drilling motors. The bearing assembly may include a thrust bearing section that is configurable through the use of multiple stackable thrust bearings disposed in a housing. Any desired number of stackable bearings may be arranged within the housing relative to spacers, spring components, and sleeves in order to reduce or eliminate the effect of axial thrust forces between a rotating drive shaft and a stationary exterior housing. Some bearings may be stacked between the spacers and corresponding springs in a configuration such that the springs distribute axial loads in a first direction across the bearings. Other bearings may be stacked relative to the spacers and spring components in a configuration such that the springs distribute axial loads in a second direction opposite the first direction across these bearings.

By using a plurality of individual, stackable thrust bearings to provide the desired support against axial forces, the disclosed bearing assembly may be configured to handle the expected axial loads on the drive shaft while maintaining approximately equal wear on each of the stackable bearings. For example, some stackable thrust bearings may be stacked in an "on-bottom" arrangement relative to the springs and spacers. The "on-bottom" arrangement means that a spring is disposed between the thrust bearing and a lower spacer located below the bearing and designed to rotate with the drive shaft. In this arrangement, the lower spacer may transfer upward forces from the drive shaft (e.g., due to weight on bit) to the spring to distribute the load across the on-bottom thrust bearing. In addition, some stackable thrust bearings may be stacked in an "off-bottom" arrangement relative to the springs and spacers, where a spring is disposed between the thrust bearing and an upper spacer located above the bearing and designed to rotate with the drive shaft. In this arrangement, the upper spacer may transfer downward forces from the drive shaft (e.g., due to hydraulic loading) to the spring to distribute the load across the off-bottom thrust bearing. The number of stackable thrust bearings in each arrangement may be selected based on a maximum amount of thrust loading expected on the drive shaft relative to the housing in each axial direction.

The bearing assembly may also include a drive shaft cap that can be coupled to the drive shaft (e.g., via threads) to apply a compression force to the rotating bearing assembly components, in order to prevent these components from rotating with respect to the drive shaft. The bearing assembly may further include a spacer that is designed to form a double shoulder connection between the drive shaft cap and the drive shaft. When the drive shaft cap is threaded onto the drive shaft with a desired torque to hold the rotating components in compression, the spacer may fill the space left between the drive shaft cap and the end of the drive shaft. By filling this space, the spacer may reduce or prevent continual makeup of the connection between the drive shaft cap and the drive shaft in response to radial forces on the drive shaft. The thickness of this spacer may be determined by a series of measurements, performed at assembly, taken on the drive shaft cap and the thrust bearing assembly components while these components are held in compression on the drive shaft.

Figure 1:
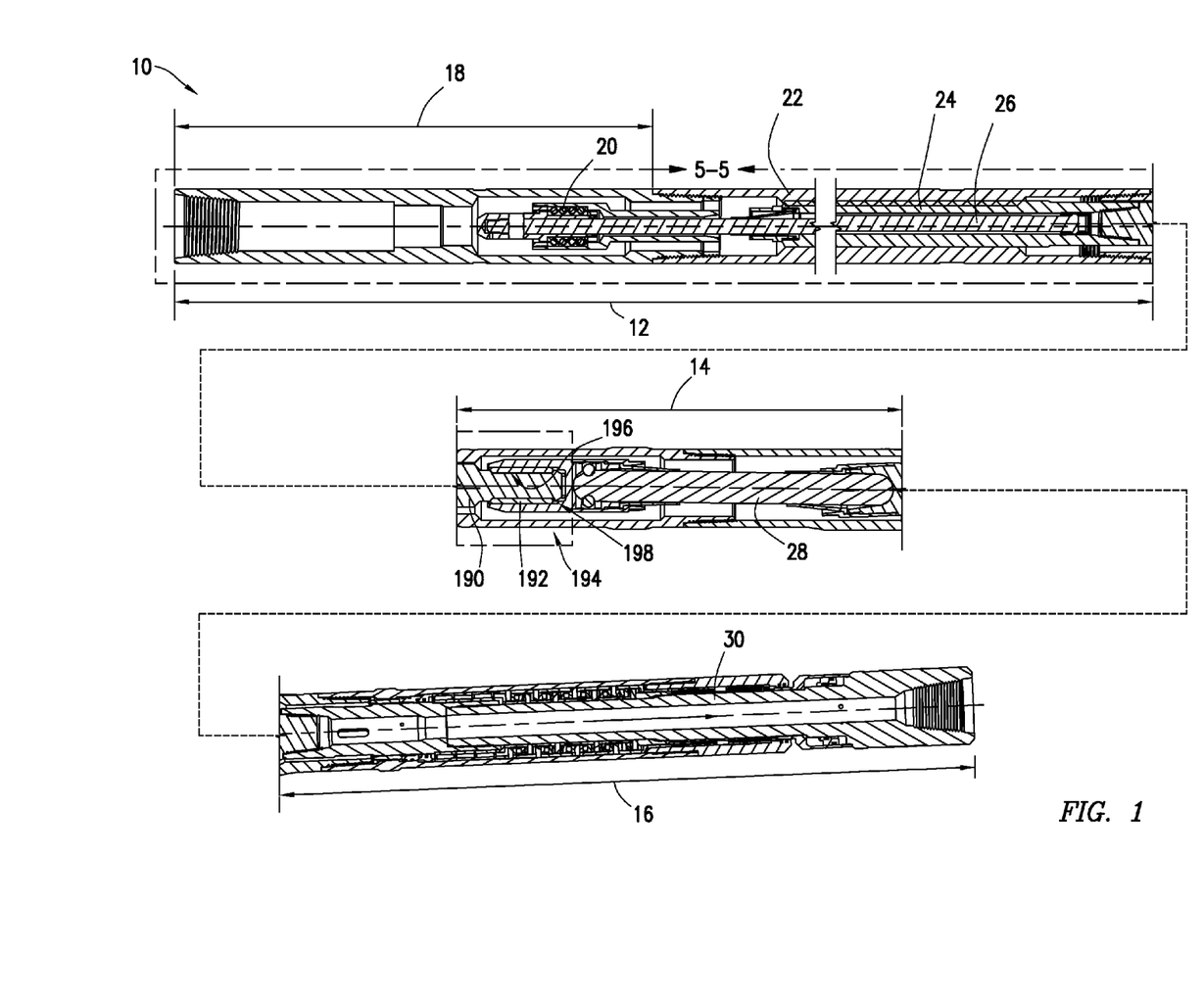
FIG. 1 is a cross sectional view of components of a downhole drilling motor, including a power section assembly, a transmission assembly, and a bearing assembly, in accordance with an embodiment of the present disclosure.

Turning now to the drawings, FIG. 1 is a cross sectional view of components of an enhanced downhole drilling motor 10. These components may include, for example, a power section assembly 12, a transmission assembly 14, and a bearing assembly 16. The power section assembly 12 may include a top sub 18 having a rotor bearing 20. The power section assembly 12 may also include a stator housing 22 with a supported rotor 24 disposed therein. A flex shaft 26 may extend through the length of the power section assembly 12, as described in detail below. The power section assembly 12 is designed to transmit a torque through the rotor 24 for rotating a drill bit coupled to a lower end of the downhole drilling motor 10.

The transmission assembly 14 may include a driven shaft 28 used to transmit torque from the rotor 24 to a drive shaft 30 in the bearing assembly 16. As described in detail below, the transmission assembly 14 may include an improved connection assembly for coupling ends of the driven shaft 28 to the rotating components of the power section assembly 12 and the bearing assembly 16. These connections may enable transmission of rotary forces between the components.

Figure 2:
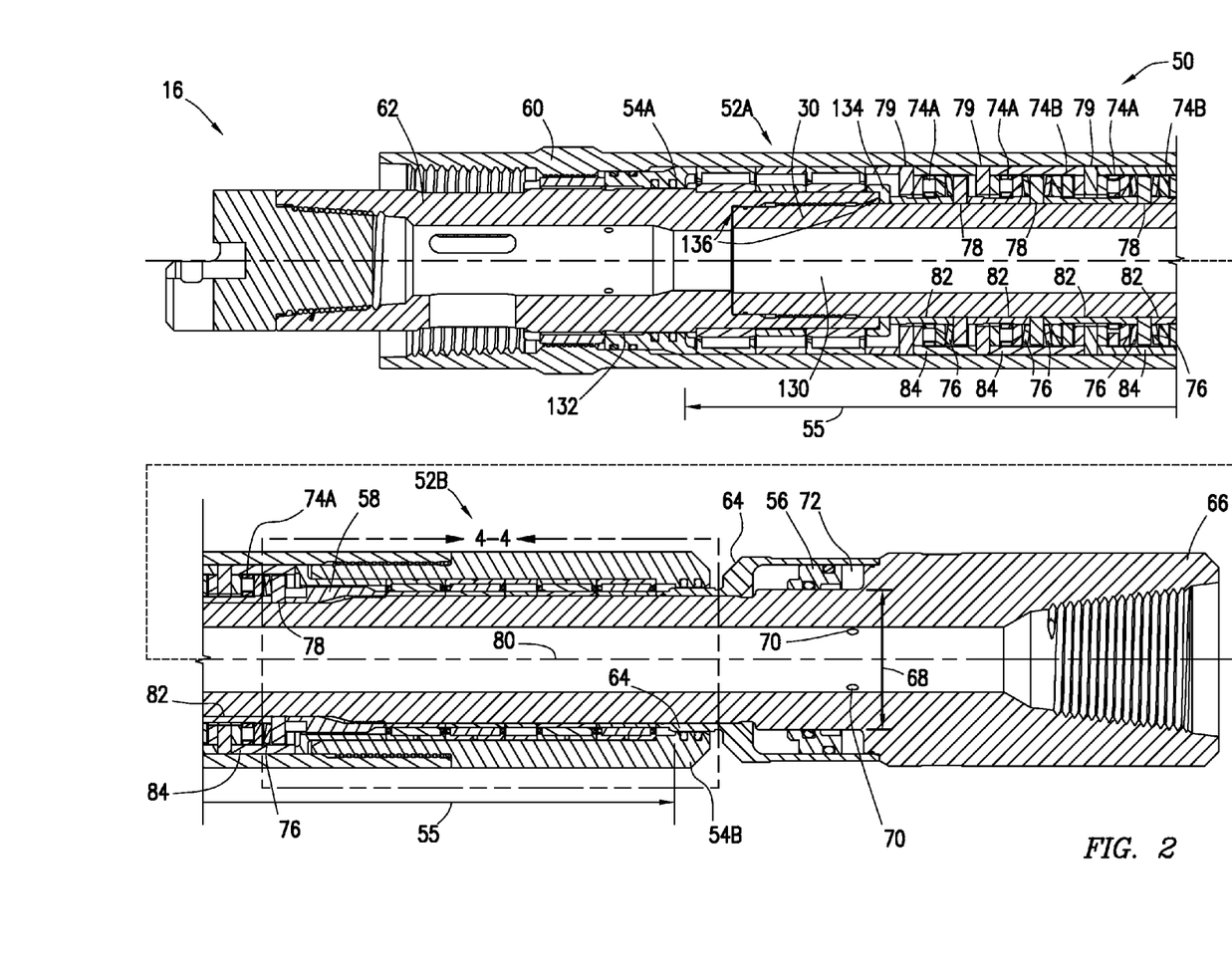
FIG. 2 is a cross sectional view of the bearing assembly of FIG. 1, in accordance with an embodiment of the present disclosure.

A more detailed view of the bearing assembly 16 is illustrated in FIG. 2. As illustrated, the bearing assembly 16 may include a thrust bearing section 50, one or more radial bearing sections (e.g., 52A and 52B), two rotary seals 54A and 54B, a compensator piston 56, a lock nut 58, a housing 60, the drive shaft 30, and a drive shaft cap 62, among other things.

In general, such rotary seals 54A and 54B as shown in FIG. 2 may be employed at each end of a sealed bearing section 55 to prevent drilling mud from entering the bearing housing 60 while sealing in lubricating oil. The upper rotary seal 54A may provide the desired sealing of the bearing section 55 while the drive shaft cap 62 is rotated relative to the housing 60. Similarly, the lower rotary seal 54B may provide the seal while enabling the drive shaft 30 and a transition ring 64 (or rotational sleeve) coupled to the drive shaft 30 to rotate relative to the housing 60. The upper rotary seal 54A and the lower rotary seal 54B may have equivalent sealing diameters in some embodiments.

The bearing assembly 16 may include a sealed transition ring 64 designed to provide pressure compensation for the sealed bearing section 55. The sealed transition ring 64 may be located just above a bit box 66 of the drive shaft 30, on a pilot diameter 68 of the drive shaft 30 for example. The compensator piston 56 is disposed in the illustrated transition ring 64, and the piston 56 is configured to prevent a high differential pressure from forming across the rotary seals 54A and 54B. In addition, the piston 56 may compensate for increases in oil volume within the sealed bearing section 55 as a result of high temperatures encountered downhole. The compensator piston 56 may rotate with the drive shaft 30 and the bearing shaft transition ring 64, thereby avoiding any need for additional rotary seals on the compensator piston 56. Weep holes 70 may be formed through a lower end of the drive shaft 30 to allow bit pressure exposure to a first side 72 of the compensator piston 56. This may provide a positive pressure inside the bearing housing 60, further discouraging mud invasion into the sealed bearing section 55.

As illustrated, the sealed bearing section 55 may include the thrust bearing section 50 disposed between two radial bearing sections 52A and 52B. The thrust bearing section 50 may utilize commercially available high capacity roller thrust bearings (i.e., 74A and 74B). For the sake of brevity, all references in this application to "thrust bearings 74" should be understood as referring to each of the thrust bearings labelled 74A and 74B in the drawings. The thrust bearings 74 may be stackable thrust bearings that are able to be selectively disposed in different arrangements within the thrust bearing section 50 to provide a desired effect, as described below. In the thrust bearing section 50, each thrust bearing 74 may be backed with a corresponding spring component 76. The spring components 76 may help to provide shock load cushioning from axial forces created while drilling. In some embodiments, the spring components 76 may include "Belleville" style washers that pre-load the thrust bearings 74.

The thrust bearing assembly may also include a plurality of spacers may be disposed one between each of the thrust bearings 74. These spacers may be stackable as well, and may include rotational spacers 78 designed to be held against and rotated with the drive shaft 30 as well as stationary spacers 79 designed to be held against and remain stationary with respect to the housing 60.

The thrust bearing section 50 may also include rotational sleeves 82 and stationary sleeves 84 disposed on opposite sides of each of the thrust bearings 74. The rotational sleeves 82 may each be disposed between a corresponding thrust bearing 74 and the drive shaft 30, and the sleeves 82 may be stacked between adjacent rotational spacers 78. The stationary sleeves 84 may each be disposed between a corresponding thrust bearing 74 and the housing 60, and the sleeves 84 may be stacked between adjacent stationary spacers 79. The sleeves (stationary and rotational) may be pre-machined to certain lengths to provide a desired preload on each of the thrust bearings 74 as specified by the commercial bearing manufacturer.

By using the rotational sleeves 82, this stackable bearing arrangement may serve to minimize diametric step changes along the length of the drive shaft 30. That is, the sleeves 82 may enable an arrangement for stacking the rotational spacers 78 at desired intervals along the drive shaft 30 without changing a diameter of the drive shaft 30 along the length of the shaft. This may reduce or eliminate stress concentrations that would otherwise be produced by shoulders and grooves in the drive shaft.

Throughout the drilling process, different axial forces may act on the drive shaft 30 relative to the bearing housing 60 in the direction of an axis 80 of the bearing assembly 16. For example, hydraulic loading may occur along the inside of the drive shaft 30 as drilling mud or other fluids are pumped through the bearing assembly 16 via the hollow drive shaft 30, thereby exerting a downward force on the drive shaft 30 relative to the housing 60. In addition, weight on bit applied to the drill string may exert an upward axial force on the drive shaft 30 relative to the housing 60.

The thrust bearing section 50 may be designed to evenly distribute axial loads over the multiple thrust bearings 74. To accommodate axial forces on the drive shaft 30 relative to the housing 60, the thrust bearings 74 may be stacked in specific arrangements with the other components in the thrust bearing section 50. For example, in the illustrated embodiment, the thrust bearing section 50 includes four stackable thrust bearings 74A positioned in an "on-bottom" arrangement relative to other components within the thrust bearing section 50 and two stackable thrust bearings 74B positioned in an "off-bottom" arrangement relative to the other components. The term "on-bottom" refers to an arrangement where a rotational spacer 78 is positioned directly below the bearing 74A and a stationary spacer 79 is positioned above the bearing 78A. In this arrangement, upward axial forces on the drive shaft 30 relative to the housing 60 (e.g., due to weight on bit) may be transferred through the lock nut 58 to the rotational sleeves 82 and spacers 78; from the rotational spacers 78 to the "on-bottom" bearings 74A; from the bearings 74A into the above stationary spacers 79 and stationary sleeves 84; and ultimately to the housing 60. Thus, the bearings 74A are able to dissipate the axial load on the drive shaft 30.

The term "off-bottom" refers to an arrangement where the rotational spacer 78 is positioned directly above the bearing 74B and a stationary spacer 79 is positioned below the bearing 74B. In this arrangement, downward axial forces on the drive shaft 30 relative to the housing 60 (e.g., hydraulic loading) may be transferred through a spacer (e.g., 134) to the rotational sleeves 82 and spacers 78; from the rotational spacers 78 to the "off-bottom" bearings 74B; from the bearings 74B to the lower stationary spacers 79 and sleeves 84; and ultimately to the housing 60. Thus, the bearings 74B are able to dissipate the load on the drive shaft 30.

All the thrust bearing section components (e.g., thrust bearings 74, spring components 76, spacers 78 and 79, and sleeves 82 and 84) may be separate stackable elements that are selectively arranged to address the expected axial forces to be encountered through the bearing section 50 during the drilling process. More specifically, the length of the sleeves 82 and 84 and the arrangements of the thrust bearings 74 relative to the spacers 78 and 79 may be chosen to provide an amount of pre-loading and a capacity to dissipate axial forces such that all the thrust bearings 74 are expected to degrade at approximately the same rate. This may increase the lifetime of the bearing assembly 16 and the efficiency of the downhole drilling motor.

The stackable bearing components (e.g., 74, 76, 78, 79, 82, and 84) may be held in compression within the bearing assembly 16 to prevent rotation of the rotational spacers 78 and sleeves 82 relative to the drive shaft 30. In addition, the stackable components of the thrust bearing section 50 may be held in compression against the radial bearing sections (e.g., 52A and 52B) disposed on one or both sides of the thrust bearing section 50.

Figure 3:
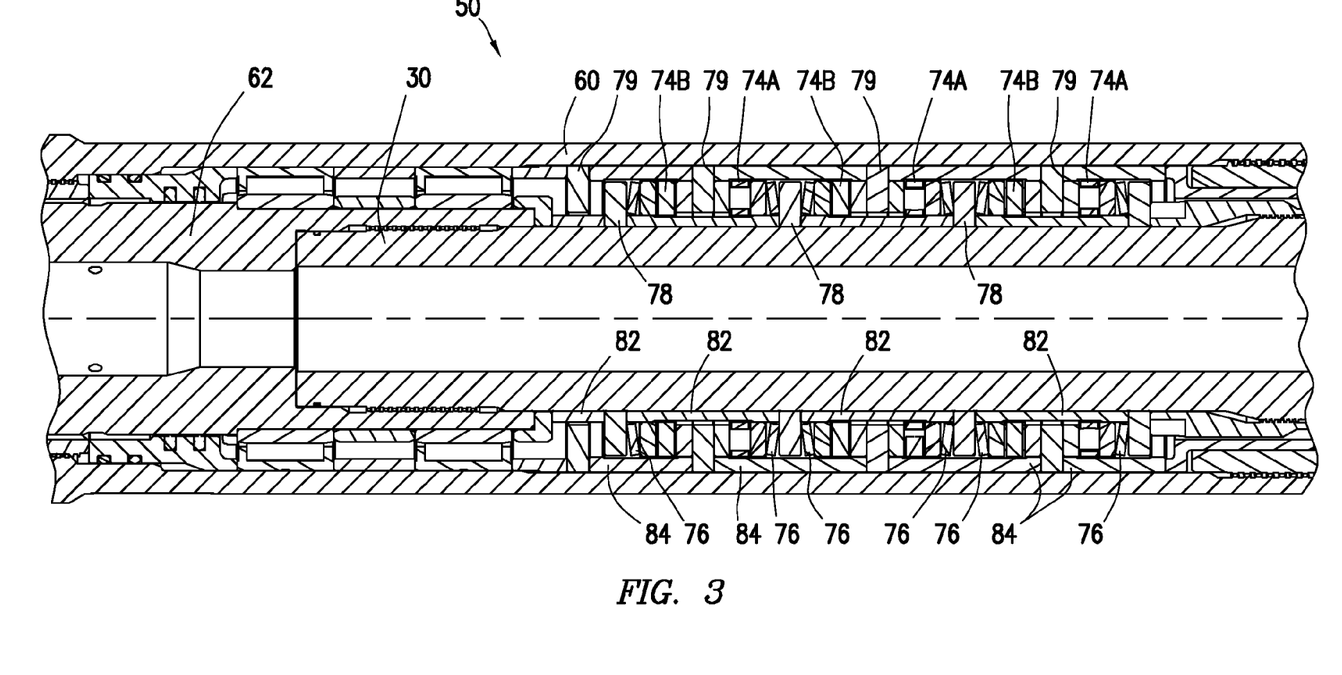
FIG. 3 is a cross sectional view of a portion of another bearing assembly, in accordance with an embodiment of the present disclosure.

As mentioned above, other arrangements of the thrust bearing section 50 may be utilized in other embodiments. As an example, FIG. 3 illustrates an embodiment of the thrust bearing section 50 that has three thrust bearings 74A stacked in the "on-bottom" arrangement and three thrust bearings 74B stacked in the "off-bottom" arrangement described above. This may be a desirable arrangement for the thrust bearing section 50 when the forces expected on the drive shaft 30 in one axial direction (e.g., up or down) relative to the housing 60 are approximately equal to the forces expected on the drive shaft 30 in the opposite direction relative to the housing 60. This arrangement may allow each of the bearings 74 to wear at approximately the same rate throughout the drilling process.

In the embodiment of FIG. 2, the expected upward forces on the drive shaft 30 (e.g., from weight on bit) relative to the housing 60 may be approximately two times the expected downward force on the drive shaft (e.g., from hydraulic loading) relative to the housing 60. Thus, twice as many thrust bearings 74 are disposed in the "on-bottom" arrangement as those disposed in the "off-bottom" arrangement. It should be noted that other combinations of "on-bottom" and "off-bottom" bearings may be utilized in other embodiments. For example, some embodiments of the bearing assembly 16 may include up to five thrust bearings 74A in the "on-bottom" arrangement and one thrust bearing 74B in the "off-bottom" configuration.

The different arrangements of the thrust bearings 74 in the thrust bearing section 50 may be provided by selecting and/or changing the sleeves (82, 84) and spacers (78, 79) when drilling conditions warrant custom bearing arrangements. For example, relatively longer sleeves (rotational or stationary) may be used against two thrust bearings 74 that are placed in opposite arrangements (e.g., one on-bottom and one off-bottom) relative to a single (stationary or rotational) spacer. Relatively shorter sleeves may be used against individual thrust bearings having the same arrangement (e.g., on-bottom or off-bottom) of an adjacent thrust bearing 74. As described below, once the appropriate combination of rotational sleeves 82, stationary sleeves 84, thrust bearings 74, spring components 76, rotational spacers 78, and stationary spacers 79 are selected and disposed adjacent one another in the desired configuration, a locking mechanism may be used to compress and pre-load the bearing components, locking them into the compressed configuration.

Figure 4:
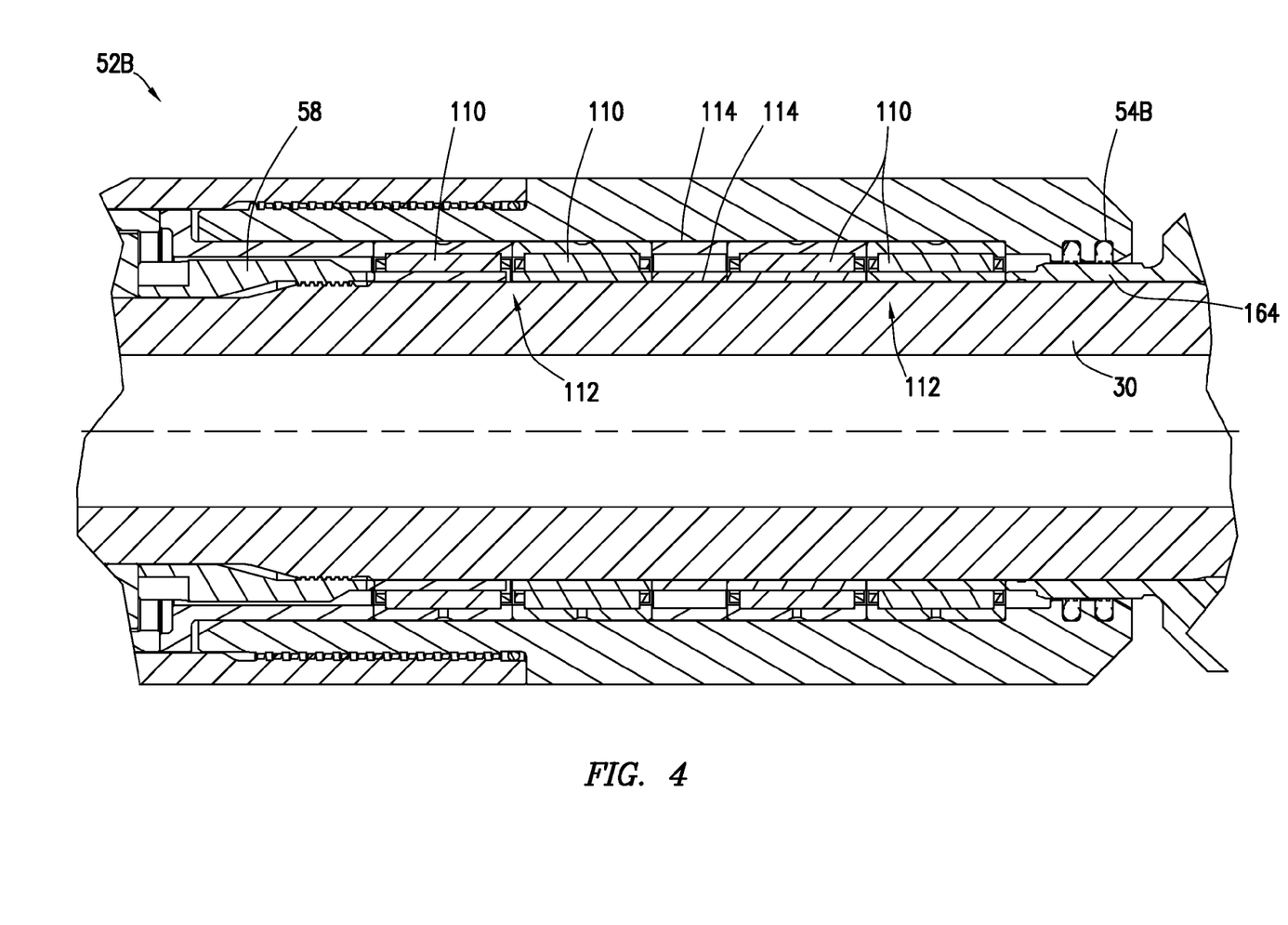
FIG. 4 is a cross sectional view of a radial bearing section that is part of the bearing assembly of FIG. 2, in accordance with an embodiment of the present disclosure.

FIG. 4 illustrates a detailed illustration of the lower radial bearing section 52B. Although only the lower radial bearing section 52B is illustrated, the upper radial bearing section 52A may include substantially the same structure as, and may function similarly to, the bearing section 52B described herein. With that in mind, the bearing sections 52A and 52B may utilize commercially available high capacity roller radial bearings 110. Multiple sets 112 of radial bearings 110 may be spaced apart via spacers 114 to provide higher radial load carrying capacities. The top and bottom bearing sets 112 may provide radial support to the drive shaft 30 as well as to the rotary seal 54, thereby preventing wear and extending the life of the seal 54.

As illustrated, the bearing assembly may include the lock nut 58 disposed between the thrust bearing section 50 and the lower radial bearing section 52B. The lock nut 58 (or lock nut ring) may be threaded (e.g., left hand thread) onto the drive shaft 30. Once installed, the lock nut 58 may compress and/or deform inner races 116 of the radial bearings 110 and the transition ring 64 to prevent rotation of these components relative to the drive shaft 30. As illustrated, the lower lock nut 58 may not pass through the lower seal 54B. That way, in case of a failure in an upper area of the drive shaft 30, the lock nut 58 may prevent any component loss from the bearing assembly.

Turning back to FIG. 2, the drive shaft cap 62 may be threaded onto the upper part of the drive shaft 30 in order to compress all rotating components of the bearing assembly 16. By compressing these components, the drive shaft cap 62 may prevent rotation of the radial bearing inner races, rotational sleeves 82, and rotational spacers 78 relative to the drive shaft 30. The drive shaft cap 62 may also divert drilling mud flow from an inner bore of the drill string to a drive shaft bore 130. Diverter slots in the drive shaft cap 62 may be optimized to minimize a pressure loss across the cap at higher mud flow rates. In some embodiments, the drive shaft cap 62 may be case hardened to minimize erosion from the mud flow turbulence. An outer diameter of the drive shaft cap 62 may be plated with hard chrome or tungsten carbide to provide a hardened and ground running surface 132 for the upper rotary seal 54A.

Some embodiments of the bearing assembly 16 may include a spacer 134 designed to create a double shouldered connection between the drive shaft cap 62 and the drive shaft 30. Accordingly, the spacer 134 may be disposed between a lower end of the drive shaft cap 62 and an upper end of the thrust bearing section 50. The spacer 134 may help to prevent continual makeup of the threaded connection 136 between the lower end of the drive shaft cap 62 and the upper end of the drive shaft 30 due to drilling vibrations. Since the drive shaft cap 62 may be made up to the drive shaft 30 at a relatively high torque, such vibrations could potentially expose the sleeves and spacers of the thrust bearing section 50 to over-torque, causing these components to yield in compression. The spacer 134, however, may keep the drive shaft cap 62 from making up too far with the drive shaft 30. This may also prevent any additional torque from damaging threads in the connection between the drive shaft cap 62 and the drive shaft 30.

It may be desirable for the spacer 134 to be machined to conform to the particular bearing assembly components. Specifically, the spacer 134 may be machined at a later point in the assembly of the tool, in order to account for machining tolerances in the stacked components of the bearing assembly 16. Each of the spacers, sleeves, and other components within the bearing assembly 16 may be manufactured with machining tolerances of approximately 1-2 thousandths of an inch. It may not be economical to lower the machining tolerances for these components. The spacer 134 may be machined to create the double shouldered connection 136 to account for these tolerances.

In order to manufacture the bearing assembly 16 with the machinable spacer 134, it may be desirable to first make up the drive shaft cap 62 to the drive shaft 30 until the threaded connection reaches a predetermined torque value. The predetermined torque value may correspond to a desired amount of compression to be applied to the bearing sections 50, 52A, and 52B via the drive shaft cap 62.

Once the drive shaft cap 62 is made up to the drive shaft 30 at the desired torque, the method for manufacturing the bearing assembly 16 may include measuring a length of the drive shaft cap 62 from an end of the bearing assembly 16. After this, it may be desirable to measure a length from the thrust bearing section 50 to the end of the bearing assembly 16. By subtracting these two measured lengths, it may be possible to determine the axial dimension of the space between the end of the drive shaft cap 62 and the upper end of the thrust bearing section 50. The spacer 134 may be machined to fit in this space, thereby providing the double shoulder connection 136 to keep the drive shaft cap 62 secured to the drive shaft 30 at the desired makeup torque. The spacer 134 may be machined in a shop after the measurements are taken.

In other embodiments (not shown), the machinable spacer 134 may be positioned to fill a space within the drive shaft cap 62 where the end of the drive shaft 30 is made up to the drive shaft cap 62. For example, if the drive shaft cap 62 is made up to provide the desired compressive pre-load on the thrust bearing section 50 but the drive shaft cap is not entirely made up against the end of the drive shaft 30, a machinable spacer may be disposed between the end of the drive shaft 30 and the drive shaft cap 62 to provide the desired double shoulder connection 136.

It should be noted that other arrangements of the machinable spacer 134 within the bearing assembly 16 may be utilized in other embodiments. For example, the spacer 134 and the drive shaft cap 62 may be disposed at a lower end of the bearing assembly 16 rather than at an upper end of the bearing assembly 16. Other placements of the machinable spacer 134 within the sealed bearing assembly 16 may be used as well. The machinable spacer 134 may enable the disclosed stackable thrust bearing assembly 50 to be used with high torque motors, since the double shouldered connection 136 formed by the spacer 134 prevents the drive shaft cap 62 from transmitting additional torque to the bearing components after the thrust bearing section 50 is initially pre-loaded in compression. Instead, any additional torque transmitted to the drive shaft cap 62 may be directed into the drive shaft 30 for turning the drill bit. In this way, the machinable spacer 134 may also facilitate efficient operation of the downhole drilling motor 10.

In some embodiments, the bearing section outer housing 60 may be constructed having a slick outer surface. However, in other embodiments the bearing housing 60 may include an upset and threaded portion to accept replaceable centralizer sleeves of any size. In embodiments of the downhole drilling motor where a centralizer is not used, a blank sleeve may be threaded into engagement with the housing 60, in order to attach the housing 60 to the drill string.

It should be noted that in some embodiments, the bearing assembly 16 may be utilized with conventional power sections and transmissions. The improved thrust bearing section 50 described above may minimize the amount of uneven axial loading on the thrust bearings disposed therein. The machinable spacer 134 may provide the double shouldered connection 136 that prevents overtorque on the threads coupling the drive shaft cap 62 to the drive shaft 30. As shown in FIG. 1, the enhanced bearing assembly 16 may also be employed in combination with an advanced power section assembly 12 and/or transmission assembly 14. The power section assembly 12 and the transmission assembly 14 are each designed to minimize the amount of axial loads being transmitted through the downhole drilling motor 10 before they reach the bearing assembly 16.

Figure 5:
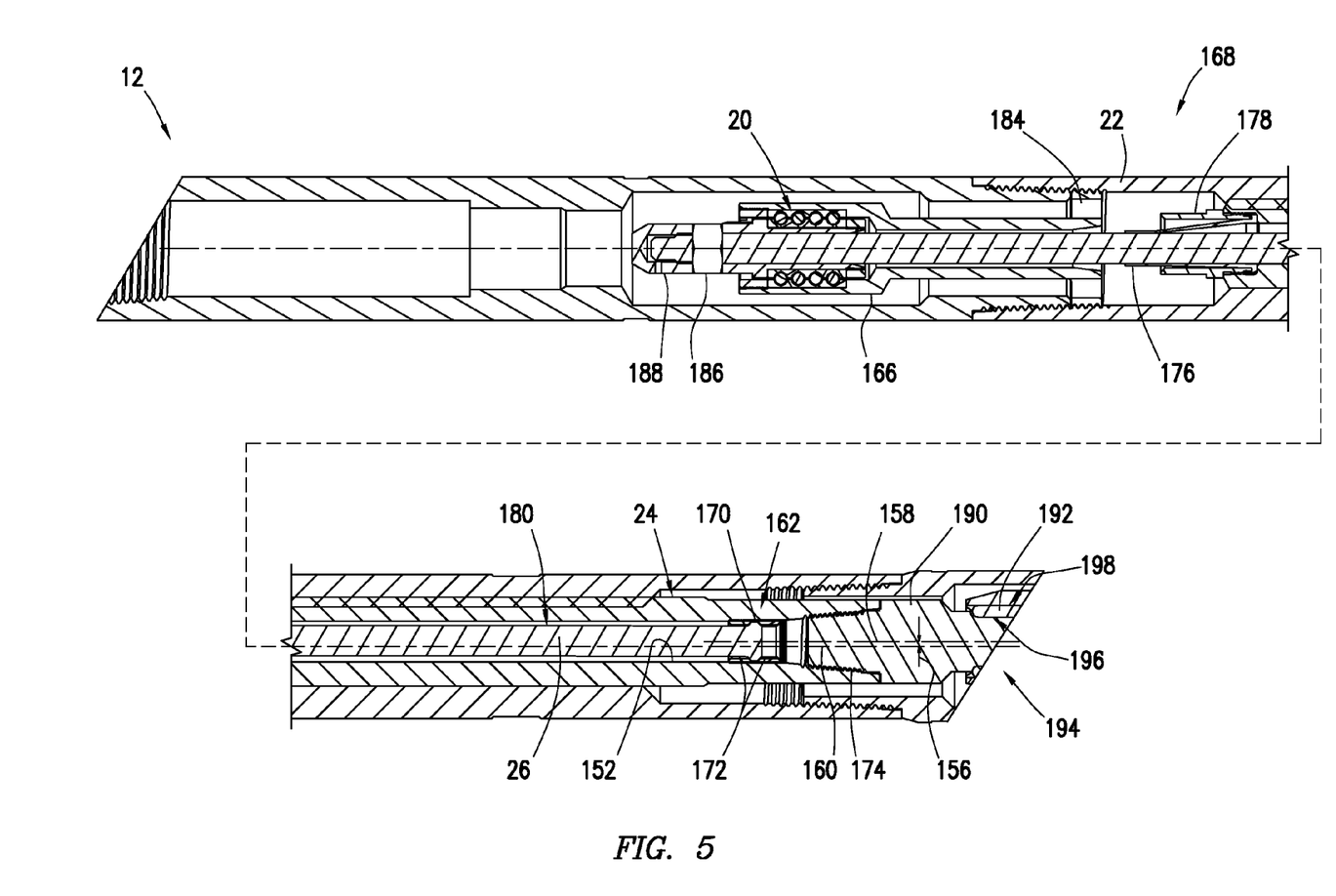
FIG. 5 is a cross sectional view of the power section assembly of FIG. 1, in accordance with an embodiment of the present disclosure.

An embodiment of the enhanced power section assembly 12 is illustrated in FIG. 5. The power section assembly 12 may include the rotor 24 constructed with a through bore 152. A rotatable shaft 26 may be disposed in the through bore 152 of the rotor 24. The shaft 26 may be designed to rotate with the rotor 24 as operated by the downhole drilling motor. As illustrated, the shaft 26 may extend beyond the length of the rotor in one direction and be centralized within the bearing assembly 20. The opposite end of the shaft 26 may be fixed to the rotor 24. In this arrangement, as described in detail below, the bearing assembly 20 may reduce the axial thrust forces transmitted from the rotor 24 to the transmission assembly, while also keeping the rotor 24 attached at an upper end of the power section assembly 12.

The power section rotor 24 may be quite long, since there are multiple stages the rotor 24 may pass through in order to produce a sufficient operating torque. In some embodiments, the power section assembly 12 may have an eccentricity that is relatively small when compared to the length of the rotor 24. The eccentricity may refer to an offset 156 of an axis 158 of the rotor 24 from a centerline 160 of the power section assembly 12. In some embodiments, for example, the eccentricity of the rotor 24 may be approximately ¼ inch, while the length of the rotor 24 may be approximately fifteen feet or longer. Since the length to eccentricity ratio of the rotor 24 is relatively large, it may be desirable to utilize a solid shaft 26 (flex-shaft) that can sufficiently deflect along the length of the rotor 24, within the fatigue limit of the material chosen for the flex-shaft 26.

The flex-shaft 26 may be designed to deflect along the length of the rotor 24 in order to remove the eccentricity by fixing an end of the flex-shaft 26 on the output side 162 of the rotor 24 and centralizing the flex-shaft 26 within the bearing assembly 20 located in a fixed housing 166 adjacent to an input side 168 of the rotor 24. This way, one end of the flex-shaft 26 may be centralized substantially in alignment with the centerline 158. In this position, the flex-shaft 26 may be used to couple the rotor 24 to the bearing assembly 20, in order to remove thrust in an axial direction from the rotor 24.

Fixing the flex-shaft 26 to the rotor 24 may be accomplished through the use of an upset 170 on the end of the flex-shaft 26. Threaded retainers 172 disposed on an inner diameter of the rotor 24 on either side of the upset 170 may retain the upset 170 of the flex-shaft 26 proximate a threaded connection 174. While operating, the upset 170 on the flex-shaft 26 may be loaded in tension. The upset 170, which is fitted into the threaded retainers 172, may function as a static thrust shoulder used to carry the tensile or axial loading on the flex-shaft 26. This axial load-carrying shoulder 170 may facilitate rotation of the flex-shaft 26 with the rotor 24, while preventing or reducing transmission of the axial load to the transmission connection. In some embodiments, keys or splines may also be employed between the upset 170 and the retainers 172 to prevent relative rotation between the rotor 24 and the flex-shaft 26. In still other embodiments, the flex-shaft 26 may be fixed to the rotor 24 directly via a threaded connection.

As illustrated, the flex-shaft 26 may exit the rotor bore 152 at the upper end 168 of the rotor 24 and may be retained by the bearing assembly 20 centered in the threaded housing 166 at the top of the power section assembly 12. That is, the flex-shaft 26 and rotor 24 may function as a hanging rotor supported via a section of bearings at the upper end. The bearing assembly 20 may include an assembly of radial bearings, thrust bearings, or a combination thereof. Thrust bearings may be particularly desirable for preventing transmission of thrust loads from the rotor 24 to the transmission assembly 14. The bearing assembly 20 may be mud lubricated, allowing the drilling mud to flow therethrough, in some embodiments. In other embodiments, the bearing assembly 20 may be sealed, lubricated with oil, and pressure compensated, similar to the bearing assembly 16 described above with reference to FIG. 1.

The power section assembly 12 may include a seal boot 176 and a retainer nut 178 disposed at the exit end of the flex-shaft 26, in order to seal the rotor bore 152 and the flex-shaft 26 from drilling fluid flowing through the assembly. An annulus 180 created between the flex-shaft 26 and the rotor bore 152 may be filled with grease or oil for lubrication, and the seal boot 176 may act as a pressure compensator for the annulus 180.

The tubular housing 166 that holds the bearing assembly 20 may be threaded into the stator tube 22 of the downhole drilling motor. This housing 166 may be machined with flow slots 184 that allow drilling fluid to pass through the housing 166. The bearing assembly 20 may also act as a rotor catch to stabilize and retain the rotor 24, thereby preventing the loss of the rotor 24 if a connection failure were to occur below the power section assembly 12. An adjustment nut 186 disposed at the upper end of the flex-shaft 26 may be used to adjust an axial position of the rotor 24 once it is installed into the stator 22. The flex-shaft 26 may also be fitted with an adjustment cap 188 designed to protect the end of the flex-shaft 26 from erosion and potential damage from solids in the drilling fluid.

Although the flex-shaft 26 is generally utilized to couple the rotor 24 to the bearing assembly 20, the flex-shaft 26 may be utilized to drive other downhole components or to provide sensor feedback within the power section assembly 12. For example, in some embodiments, the flex-shaft 26 may be used as a shaft for a dynamo or alternator to provide DC or AC power, respectively, to various downhole components. In other embodiments, the power section assembly 12 may further include sensors, such as tachometers or speed indicators, disposed adjacent the flex-shaft 26. These sensors may provide feedback related to the rotational speed of the rotor 24.

The threaded connection 174 may couple the lower end of the rotor 24 with a rotor head adaptor 190. As illustrated in FIG. 1, the rotor head adaptor 190 may be used to connect the rotor 24 of the power section assembly 12 with the driven shaft 28 of the transmission assembly 14. In some embodiments, the rotor head adaptor 190 may be fitted with splines or keys 192 to form a keyed connection 194 between the power section rotor head and the improved transmission coupling. For example, cylindrical keys 192 may be located in machined slots 196 on the male portion of the connection 194 (e.g., rotor head adaptor 190), and these keys 192 may be designed to slide into machined slots 198 on the inside diameter of the female portion of the connection 194 (e.g., transmission assembly 14). It should be noted that in other embodiments the male and female portions of the connection 194 may be reversed, such that the male portion of the connection 194 is on transmission and the female portion of the connection 194 is on the rotor head. This sliding connection 194 may decouple the transmission assembly 14 from the rotor 24 in the axial direction, thereby assuring that the transmission assembly 14 is not compressively loaded. In addition, the sliding connection 194 may enable the housing threads to be made up relatively easily, since the rotor is not being pushed into the stator of the power section while the threads are being made up between the power section and the transmission assembly 14.

Figure 6:
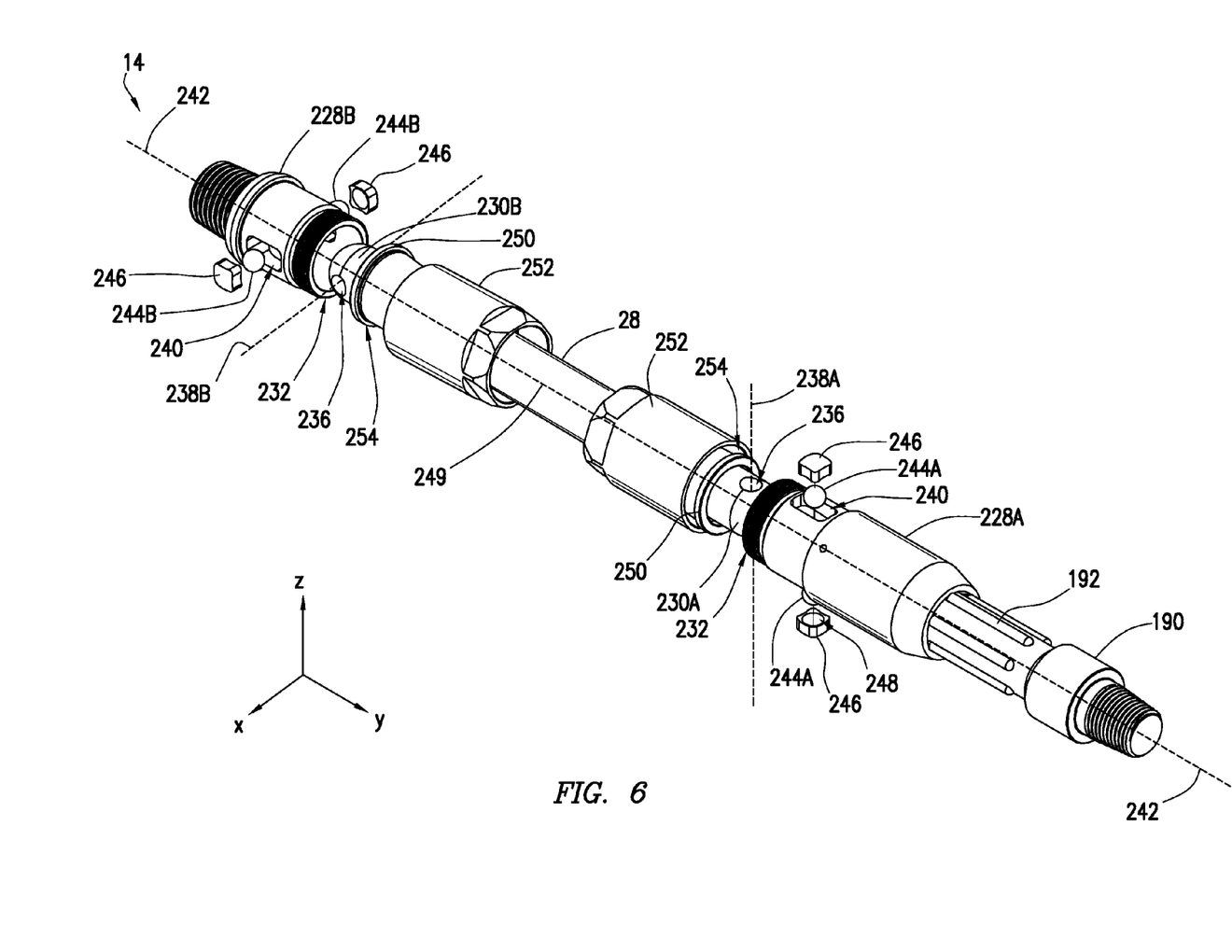
FIG. 6 is an exploded perspective view of the transmission assembly of FIG. 1, in accordance with an embodiment of the present disclosure.
Figure 7:
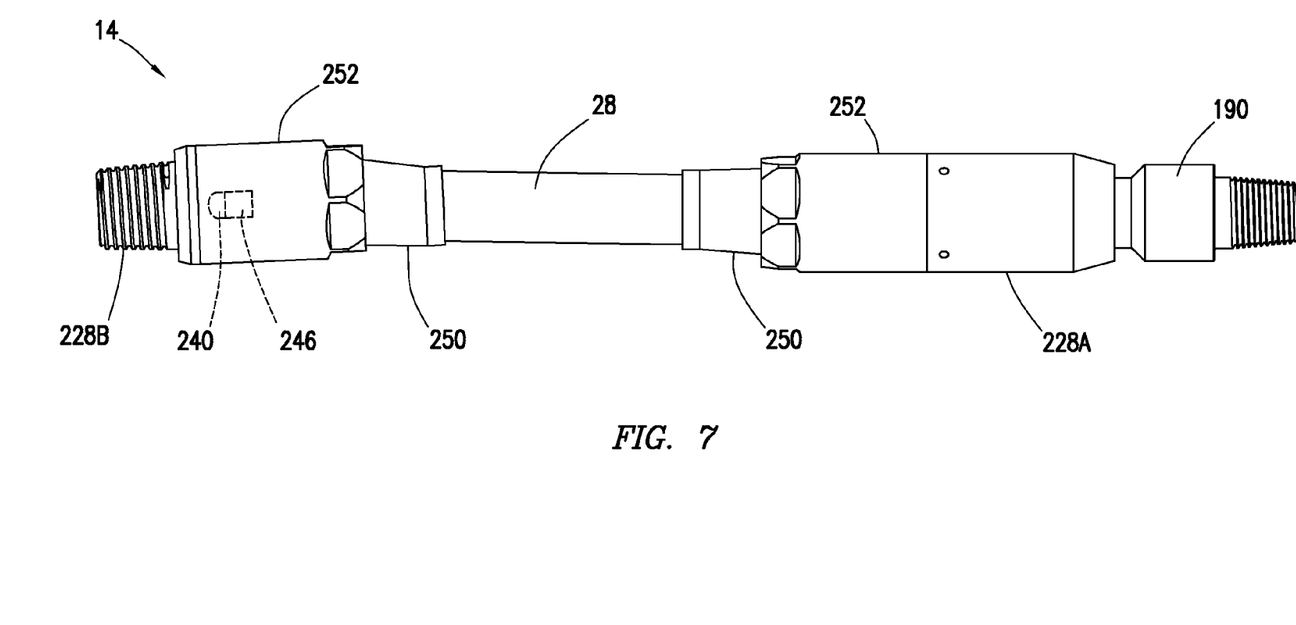
FIG. 7 is a side view of the transmission assembly of FIG. 6, in accordance with an embodiment of the present disclosure.

As shown in FIG. 1, the bearing assembly 16 may be disposed in a housing that is bent (i.e., not axially aligned) with respect to the power section assembly 12. The transmission assembly 14 may facilitate transfer of rotary power between these unaligned components, from the power section assembly 12 to the bearing assembly 16. FIGS. 6 and 7 illustrate an embodiment of the enhanced transmission assembly 14 (or transmission coupling) used to transmit torque from the power section assembly 12 to the drive shaft in the bearing assembly 16. As described below, the transmission assembly 14 may enable torque transmission while minimizing the effect of axial loading on the bearing components within the transmission assembly 14. As illustrated, the transmission assembly 14 may include the driven shaft 28 disposed between and movably coupled to two connectors 228A and 228B. The connector 228A represents the upper connector on the transmission side of the keyed connection 194 described above, while the connector 228B represents the lower connector used to couple the transmission assembly 14 to the bearing assembly 16.

In the illustrated transmission assembly 14, the driven shaft 28 may include spherical surfaces 230A and 230B machined into each end of the driven shaft 28. The spherical ends 230A and 230B on the central shaft 28 may fit into corresponding spherical sockets 232 that are machined into bores formed in the upper "Driver" connector 228A and the lower connector 228B. These spherical sockets 232 may allow each spherical end 230A and 230B to pivot with respect to the central drive shaft in the bearing assembly.

Spherical (e.g., ball) shaped sockets 236 may be machined into each end 230A and 230B of the driven shaft 28. At each end 230A and 230B, a pair of two sockets 236 may be machined at approximately 180 degrees apart from each other around the circumference of the end. The pairs of sockets 236 may be positioned approximately 90 degrees out of phase from one end 230A to the other end 230B. This may enable rotation of the driven shaft 28 about two different orthogonal axes 238A and 238B. In addition, the transmission assembly 14 may include slots 240 machined into each connector 228 to match the respective spherical sockets 236 machined into the ends 230A and 230B of the driven shaft 28. The slots 240 may be oriented in a direction parallel to an axis 242 of the corresponding connectors 228, as shown.

Ball bearings (e.g., rock bit ball bearings) may be placed one through each slot 240 and into the corresponding spherical socket 236 machined into the driven shaft 28. After the ball bearings (e.g., 244A and 244B) are placed inside the corresponding spherical sockets 236, slide blocks 246 may be disposed one over each of the ball bearings 244 and fitted into the corresponding slot 240 machined into each connector 228. For the sake of brevity, all references in this application to "ball bearings 244" should be understood as referring to either set of ball bearings labelled 244A and 244B in the drawings. The slide blocks 246 may each be machined to include a spherical (ball-shaped) pocket 248 designed to fit onto the ball bearings 244. The slide blocks 246 are machined for a slide fit when installed into the slots 240 of each connector 228. That way, the slide blocks 246 may enable the ball bearings 244 on opposite sides of a given end (e.g., 230A or 230B) to slide in opposite directions axially with respect to the connector 228. In other words, the slide blocks 246 may facilitate sliding connections between the driven shaft 28 and each connector 228 to enable a given pair of ball bearings 244 to move opposite one another in a direction substantially parallel to the longitudinal axis 242 of the first connector. This facilitates a rotation of the driven shaft 28 about an axis orthogonal to the axis along which the shaft 28 rotates via the connection between the ball bearings 244 and the spherical slots 236.

The ball bearing and slide block assemblies at each end 230A and 230B of the driven shaft 28 may enable freedom of movement of the driven shaft 28 in two planes. At the upper end 230A, for example, the ball bearings 244A may facilitate movement of the driven shaft 28 in the X-Y plane, where the X-axis is parallel to the lower connection axis 238B and the Y-axis is parallel to a shaft axis 249. In addition, the slide blocks 246 moving within the slots 240 at the upper connector 228A may facilitate movement of the driven shaft 28 in the Y-Z plane, where the Z-axis is parallel to the upper connection axis 238A. The ball bearings 244B at the lower end 230B may facilitate movement of the driven shaft 28 in the Y-Z plane. In addition, the slide blocks 246 moving within the slots 240 at the lower connector 228B may facilitate movement of the driven shaft 28 in the X-Y plane.

Using the slide blocks 246 to support the ball bearings 244 may ensure that the ball bearings 244 are loaded compressively (e.g., in the direction of the corresponding axes 238) instead of being loaded in shear (e.g., in a direction parallel to the axis 242). The compressive load carrying capacity of the ball bearings 244 may generally be much higher than the shear loading capacity of the ball bearings 244. Thus, the disclosed embodiment may enable a longer lifetime of the ball bearings 244 used to enable movement of the driven shaft 28 relative to the connectors 228 than would be available using conventional transmission designs.

The slide blocks 246 may also serve to distribute the load created by the torque from the power section assembly without damaging or "ringing out" the connectors 228. Specifically, each of the slide blocks 246 provides a flat load bearing surface area to distribute the torque load along the side of the corresponding machined slot 240. The torque load may be distributed across a larger surface area, as opposed to line contact loading along a single point or line that is typically used in existing transmission systems. Such line contact loading is undesirable as it may lead to premature degradation of the transmission assembly. Accordingly, the disclosed transmission assembly 14 may enable the transmission of rotary motion from the power section assembly to the drive shaft in the bearing assembly without causing undesirable wear on the bearing components (e.g., ball bearings 244, pockets 248, etc.).

In addition to the components mentioned above, the transmission assembly 14 may include seal boots 250 (e.g., seals, boots, and/or other retainer components) disposed on each end 230A and 230B of the driven shaft 28 to retain the assembly of ball bearings 244, slide blocks 246, and the shaft end within the connector 228. The seal boots 250 may also provide pressure compensation for grease or oil within the assembly that is used to further the service life of the transmission coupling. Slide block caps 252 may be disposed over each end 230A and 230B and threaded to each connector 228. The slide block cap 252 may be used to retain the slide blocks 246 after the blocks 246 are installed over the ball bearings 244 and into the slots 240 in each connector 228. The slide block cap 252 may also retain the seal boot 240 by providing an inner shoulder to trap a molded lip 254 on the seal boot 250 between the cap 252 and the connector 228.

While the disclosure may be susceptible to various modifications and alternative forms, specific embodiments have been shown by way of example in the drawings and have been described in detail herein. However, it should be understood that the disclosure is not intended to be limited to the particular forms described. Rather, the disclosure is to cover all modifications, equivalents, and alternatives falling within the spirit and scope of the embodiments as defined by the following appended claims.

What is claimed is:

1. A bearing assembly for use in a downhole drilling motor, comprising:
   a housing;
   a drive shaft disposed in the housing and rotatable with respect to the housing about an axis;

a first stackable thrust bearing disposed between the housing and the drive shaft and configured to distribute axial loads acting in a first axial direction on the drive shaft relative to the housing;

a second stackable thrust bearing disposed between the housing and the drive shaft and configured to distribute axial loads acting in a second axial direction on the drive shaft relative to the housing;

wherein each of the first and second stackable thrust bearings comprises a rotational race, a stationary race, and a bearing element;

a first stationary spacer disposed in contact with the housing and in an axially stacked position in the first axial direction from the first stackable thrust bearing;

a second stationary spacer disposed in contact with the housing and in an axially stacked position in the second axial direction from the second stackable thrust bearing;

a rotational spacer disposed in contact with the drive shaft and in an axially stacked position between the first and second stackable thrust bearings;

a first spring disposed axially between the first stackable thrust bearing and the rotational spacer;

a second spring disposed axially between the second stackable thrust bearing and the rotational spacer;

a first rotational sleeve disposed between the drive shaft and the first stackable thrust bearing and in an axially stacked position in the first axial direction from the rotational spacer;

a second rotational sleeve disposed between the drive shaft and the second stackable thrust bearing and in an axially stacked position in the second axial direction from the rotational spacer; and a stationary sleeve disposed between the housing and the first and second stackable thrust bearings, wherein the stationary sleeve is in an axially stacked position between the first and second stationary spacers.

2. The bearing assembly of claim 1, wherein the bearing assembly is configured to distribute axial loads acting in the first axial direction on the drive shaft from the drive shaft to the second rotational sleeve, the rotational spacer, the first stackable thrust bearing, the second stationary spacer, the stationary sleeve, and into the housing.

3. The bearing assembly of claim 1, wherein the bearing assembly is configured to distribute axial loads acting in the second axial direction on the drive shaft from the drive shaft to the first rotational sleeve, the rotational spacer, the second stackable thrust bearing, the first stationary spacer, the stationary sleeve, and into the housing.

4. The bearing assembly of claim 1, further comprising:
a plurality of stackable thrust bearings comprising at least the first and second stackable thrust bearings disposed between the housing and the drive shaft in an axially stacked arrangement;
a plurality of rotational spacers which includes at least the rotational spacer disposed in contact with the drive shaft in an axially stacked arrangement;
a plurality of stationary spacers which includes at least the first and second stationary spacers disposed in contact with the housing in an axially stacked arrangement, wherein each of the plurality of stackable thrust bearings is disposed between one of the plurality of rotational spacers and one of the plurality of stationary spacers;
a plurality of rotational sleeves which includes at least the first and second rotational sleeves each disposed between the drive shaft and at least one of the plurality of stackable thrust bearings, wherein each of the plurality of rotational sleeves is in contact with the drive shaft and disposed between two adjacent rotational spacers; and
a plurality of stationary sleeves which includes at least the stationary sleeve each disposed between the housing and at least one of the plurality of stackable thrust bearings, wherein each of the plurality of stationary sleeves is in contact with the housing and disposed between two adjacent stationary spacers.

5. The bearing assembly of claim 4, wherein at least one of the plurality of stackable thrust bearings is disposed in an on-bottom arrangement, and wherein at least one of the plurality of stackable thrust bearings is disposed in an off-bottom arrangement, wherein in the on-bottom arrangement the stackable thrust bearing is disposed in an axially stacked position in the first axial direction from an adjacent rotational spacer with a spring between the stackable thrust bearing and the adjacent rotational spacer; and wherein in the off-bottom arrangement the stackable thrust bearing is disposed in an axially stacked position in the second axial direction from an adjacent rotational spacer with a spring between the stackable thrust bearing and the adjacent rotational spacer.

6. The bearing assembly of claim 5, wherein the number of stackable thrust bearings disposed in the on-bottom arrangement is different than the number of stackable thrust bearings disposed in the off-bottom arrangement.

7. The bearing assembly of claim 1, wherein the drive shaft has a consistent outer diameter along a length of a thrust bearing section comprising the first and second stackable thrust bearings.

8. The bearing assembly of claim 1, wherein the first axial direction is toward a transmission assembly of the downhole drilling motor coupled to the bearing assembly, and wherein the second axial direction is toward a drill bit of the downhole drilling motor.

9. The bearing assembly of claim 1, wherein the first and second stackable thrust bearings, the first and second stationary spacers, the rotational spacer, the first and second rotational sleeves, and the stationary sleeve are maintained in an axially stacked arrangement relative to each other via a compressive force.

10. The bearing assembly of claim 9, wherein the first and second stackable thrust bearings are pre-loaded via the compressive force.

11. The bearing assembly of claim 1, further comprising a radial bearing section comprising a plurality of radial bearings disposed adjacent a thrust bearing section comprising the first and second stackable thrust bearings.

12. The bearing assembly of claim 1, further comprising:
a drive shaft cap coupled to the drive shaft via a threaded connection;
a lock nut threaded onto the drive shaft adjacent a bearing section comprising the first and second stackable thrust bearings; and
a spacer disposed between an end of the drive shaft cap and the bearing section, wherein the spacer and the lock nut define a double shoulder connection and wherein the drive shaft cap is torqued to apply a pre-determined compressive force to the bearing section.

13. A downhole drilling motor, comprising:
a housing;
a drive shaft disposed in the housing and rotatable with respect to the housing about an axis;
a transmission;

a drive shaft cap coupled between a first axial end of the drive shaft and the transmission, wherein the drive shaft cap is coupled to the drive shaft via a threaded connection;

a bearing section disposed between the housing and the drive shaft to facilitate rotation of the drive shaft relative to the housing;

a lock nut threaded onto the drive shaft adjacent the bearing section; and a machinable spacer positioned against the drive shaft cap and the drive shaft, wherein the machinable spacer and the lock nut define a double shoulder connection, and wherein the drive shaft cap is torqued to apply a pre-determined compressive force to the bearing section.

14. The downhole drilling motor of claim 13, wherein the machinable spacer is disposed directly between an end of the bearing section and an end of the drive shaft cap and the drive shaft cap is threaded into an axial position along the drive shaft to apply the pre-determined compressive force.

15. The downhole drilling motor of claim 13, wherein the bearing section comprises:

a plurality of stackable thrust bearings disposed between the housing and the drive shaft in an axially stacked arrangement;

a plurality of rotational spacers disposed in contact with the drive shaft in an axially stacked arrangement;

a plurality of stationary spacers disposed in contact with the housing in an axially stacked arrangement, wherein each of the plurality of stackable thrust bearings is disposed between one of the plurality of rotational spacers and one of the plurality of stationary spacers;

a plurality of rotational sleeves each disposed between the drive shaft and at least one of the plurality of stackable thrust bearings, wherein each of the plurality of rotational sleeves is in contact with the drive shaft and disposed between two adjacent rotational spacers; and a plurality of stationary sleeves each disposed between the housing and at least one of the plurality of stackable thrust bearings, wherein each of the plurality of stationary sleeves is in contact with the housing and disposed between two adjacent stationary spacers.

16. A method of manufacturing a bearing assembly for use in a downhole drilling motor, comprising:

disposing a first rotational sleeve between the drive shaft and the housing such that the first rotational sleeve is in contact with the drive shaft;

disposing a second rotational sleeve between the drive shaft and the housing such that the second rotational sleeve is in contact with the drive shaft;

disposing a stationary sleeve between the drive shaft and the housing such that the stationary sleeve is in contact with the housing;

stacking a rotational spacer between the first and second rotational sleeves such that the rotational spacer is in contact with the drive shaft at a first end and extends toward the stationary sleeve at a second end opposite the first end;

stacking a first stationary spacer against the stationary sleeve such that the first stationary spacer is in contact with the housing at a first end and extends toward the first rotational sleeve at a second end opposite the first end;

stacking a second stationary spacer against the stationary sleeve such that the second stationary spacer is in contact with the housing at a first end and extends toward the second rotational sleeve at a second end opposite the first end;

stacking a first thrust bearing between the rotational spacer and the first stationary spacer, wherein the first thrust bearing is configured to distribute axial loads acting in a first axial direction on the drive shaft relative to the housing;

stacking a second thrust bearing between the rotational spacer the second stationary space, wherein the second thrust bearing is configured to distribute axial loads acting in a second axial direction on the drive shaft relative to the housing, wherein each of the first and second stackable thrust bearings comprises a rotational race, a stationary race, and a bearing element;

stacking a first spring between the first thrust bearing and the rotational spacer; and stacking a second spring between the second thrust bearing and the rotational spacer.

17. The method of claim 16, further comprising coupling a drive shaft cap to an end of the drive shaft, wherein the drive shaft cap comprises a shoulder to apply a compressive force for holding a thrust bearing section comprising the first and second rotational sleeves, the stationary sleeve, the first and second stationary spacers, the rotational spacers, and the first and second thrust bearings.

18. The method of claim 17, further comprising:

coupling the drive shaft cap to the drive shaft at a pre-determined torque via a threaded connection;

measuring a first distance between the drive shaft cap and an end of the bearing assembly;

measuring a second distance between an end of the thrust bearing section comprising the first and second thrust bearings and the end of the bearing assembly;

subtracting the second distance from the first distance to determine an axial dimension;

machining a spacer to conform to the axial dimension of the space; and disposing the spacer in a position against the drive shaft cap and the drive shaft.

* * * * *